United States Patent
Kummer

(10) Patent No.: US 9,398,327 B2
(45) Date of Patent: *Jul. 19, 2016

(54) TIMER DISTRIBUTION ACROSS MULTIPLE CLIENT DEVICES

(71) Applicant: EchoStar Technologies L.L.C., Englewood, CO (US)

(72) Inventor: David Kummer, Highlands Ranch, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,760

(22) Filed: Apr. 2, 2015

(65) Prior Publication Data

US 2015/0215667 A1    Jul. 30, 2015

Related U.S. Application Data

(63) Continuation of application No. 13/792,627, filed on Mar. 11, 2013, now Pat. No. 9,025,939.

(60) Provisional application No. 61/611,483, filed on Mar. 15, 2012, provisional application No. 61/739,528, filed on Dec. 19, 2012.

(51) Int. Cl.
| | |
|---|---|
| *H04N 5/76* | (2006.01) |
| *H04N 21/433* | (2011.01) |
| *H04N 5/91* | (2006.01) |
| *H04N 5/782* | (2006.01) |
| *H04N 21/4147* | (2011.01) |
| *H04N 21/458* | (2011.01) |
| *H04N 21/472* | (2011.01) |
| *H04N 21/475* | (2011.01) |
| *H04N 21/266* | (2011.01) |
| *H04N 21/41* | (2011.01) |
| *H04N 21/61* | (2011.01) |
| *H04N 21/643* | (2011.01) |
| *H04N 5/765* | (2006.01) |

(52) U.S. Cl.
CPC ........... *H04N 21/4334* (2013.01); *H04N 5/782* (2013.01); *H04N 5/91* (2013.01); *H04N 21/26606* (2013.01); *H04N 21/4113* (2013.01); *H04N 21/4126* (2013.01); *H04N 21/4147* (2013.01); *H04N 21/4583* (2013.01); *H04N 21/4751* (2013.01); *H04N 21/47214* (2013.01); *H04N 21/6143* (2013.01); *H04N 21/64322* (2013.01); *H04N 5/765* (2013.01)

(58) Field of Classification Search
CPC ......... H04N 5/765; H04N 5/782; H04N 5/91; H04N 21/4174; H04N 21/4334; H04N 21/4583; H04N 21/47214; H04N 21/4751
See application file for complete search history.

(56) References Cited

U.S. PATENT DOCUMENTS

| | | | |
|---|---|---|---|
| 5,467,197 A | 11/1995 | Hoff | |
| 6,058,238 A | 5/2000 | Ng | |
| 9,025,939 B2 * | 5/2015 | Kummer | H04N 5/782 386/292 |
| 2010/0169926 A1 | 7/2010 | Westberg et al. | |
| 2012/0027385 A1 | 2/2012 | Morohoshi et al. | |
| 2013/0243396 A1 | 9/2013 | Kummer | |

* cited by examiner

*Primary Examiner* — Huy T Nguyen

(74) *Attorney, Agent, or Firm* — Kilpatrick Townsend & Stockton LLP

(57) ABSTRACT

Various arrangements for managing digital video recorder timers are presented. A timer management computer system may receive a timer associated with a user account, wherein the timer specifies a television channel, a date, and a time period for recording. The timer management computer system may determine one or more television receivers associated with the user account. In response to the received timer, the one or more television receivers may be notified of the timer.

28 Claims, 8 Drawing Sheets

TIMER DISTRIBUTION ACROSS MULTIPLE CLIENT DEVICES

CROSS-REFERENCES TO RELATED APPLICATIONS

This application is a continuation of U.S. application Ser. No. 13/792,627, filed Mar. 11, 2013, entitled "Timer Distribution Across Multiple Client Devices," which claims priority to U.S. provisional application 61/611,483, filed Mar. 15, 2012, entitled "Reception, Recording, Storage, and Manipulation of Multiple Television Channels", and claims priority to U.S. provisional application 61/739,528, filed Dec. 19, 2012, entitled "Timer Distribution Across Multiple Client Devices,". The entire disclosures of which are hereby incorporated by reference for all purposes.

This application claims priority to co-pending U.S. provisional application 61/739,528, filed Dec. 19, 2012, entitled "Timer Distribution Across Multiple Client Devices," the entire disclosure of which is hereby incorporated by reference for all purposes.

BACKGROUND

A Digital Video Recorder (DVR) may allow a user to record a television program for viewing at a later time. The user may specify a time period, date, and television channel to be recorded. In response, the specified television channel may be recorded at the specified date and time period. Such an arrangement may be useful if the user intends on watching the recorded television programming at a television local to the DVR. However, if the user is geographically separated from the DVR, the user may not be able to access the recorded television programming from his remote location.

SUMMARY

In some embodiments, a system for managing a digital video recorder timer at a plurality of television receivers is presented. The system may include the plurality of television receivers. Each television receiver of the plurality of television receivers may be linked with a particular user account. The system may include a timer management computer system. The timer management computer system may receive a timer associated with the particular user account. The timer may specify a television program to be recorded. Based on the received timer, the timer management computer system may notify each television receiver of the plurality of television receivers of the timer. In response to being notified of the timer, each television receiver of the plurality of television receivers records the television channel at the date and the time indicated by the timer.

Embodiments of such a system may include one or more of the following: The timer management computer system being configured to notify each television receiver of the plurality of television receivers of the timer may include the timer management computer system being configured to, for each television receiver of the plurality of television receivers: determine if a first network connection is available with the television receiver; if the first network connection is available, use the first network connection to notify the television receiver of the timer; and if the first network connection is not available, create an addressed message addressed for the television receiver, wherein the addressed message indicates the timer. The timer management computer system being configured to notify each television receiver of the plurality of television receivers of the timer may include the timer management computer system being configured to, for each television receiver of the plurality of television receivers: if the first network connection is not available, cause the created addressed message that indicates the timer to be transmitted to the television receiver via a satellite-based communication network. The system may include a second plurality of television receivers, wherein the addressed message is received by the second plurality of television receivers. The second plurality of television receivers may include the plurality of television receivers, and additional television receivers linked with other user accounts. Each television receiver of the second plurality of television receivers besides a television receiver of the plurality of television receivers may be configured to ignore content of the addressed message. The first network connection may be available for at least a first television receiver of the plurality of television receivers. The first network connection may not be available for at least a second television receiver of the plurality of television receivers.

Additionally or alternatively, embodiments of such a system may include one or more of the following: The system may include television receiver separate from the plurality of television receivers, wherein the timer is received by the timer management computer system from the television receiver. The timer may be received by the timer management computer system from a device selected from the group consisting of: a mobile phone; a tablet computer; a laptop computer; a computing device; and a desktop computer system. Separate receiving hardware used by each television receiver of the plurality of television receivers may include a satellite antenna. Each television receiver may use separate receiving hardware to receive television programming from a television service provider.

In some embodiments, a method for managing a digital video recorder timer at a plurality of television receivers may be presented. The method may include receiving, by a timer management computer system, a timer associated with a particular user account. Each television receiver of the plurality of television receivers may be linked with a particular user account. The timer may specify a television program to be recorded. The method may include, based on the received timer, notifying, by the timer management computer system, each television receiver of the plurality of television receivers of the timer. In response to being notified of the timer, each television receiver of the plurality of television receivers may record the television channel at the date and the time indicated by the timer.

Embodiments of such a method may include one or more of the following: Notifying each television receiver of the plurality of television receivers of the timer may include, for each television receiver: determining, by the timer management computer system, if a first network connection is available with the television receiver; if the first network connection is available, using the first network connection to notify the television receiver of the timer; and if the first network connection is not available, creating an addressed message addressed for the television receiver, wherein the addressed message indicates the timer. Notifying each television receiver of the plurality of television receivers of the timer may include, for each television receiver: if the first network connection is not available, causing the created addressed message that indicates the timer to be transmitted to the television receiver via a satellite-based communication network. The method may include receiving, by the timer management computer system, from a television receiver separate from the plurality of television receivers, the timer. The timer may be received by the timer management computer system from a device selected from the group consisting of: a mobile phone; a tablet computer; a laptop computer; a computing device; and a desktop computer system. Each television receiver may use separate receiving hardware to receive television programming from a television service provider.

In some embodiments, a non-transitory processor-readable medium for managing a digital video recorder timer at a plurality of television receivers is presented. The non-transitory computer-readable medium may include processor-readable instructions configured to cause one or more processors to receive a timer associated with a particular user account. Each television receiver of the plurality of television receivers may be linked with a particular user account. The timer may specify a television program to be recorded. The instructions may cause the one or more processors to, based on the received timer, notify each television receiver of the plurality of television receivers of the timer. In response to being notified of the timer, each television receiver of the plurality of television receivers may record the television channel at the date and the time indicated by the timer.

In embodiments of the non-transitory processor-readable medium, one or more of the following may be present: The processor-readable instructions that cause the one or more processors to notify each television receiver of the plurality of television receivers of the timer may include instructions that cause the one or more processors to, for each television receiver: determine if a first network connection is available with the television receiver; if the first network connection is available, use the first network connection to notify the television receiver of the timer; and if the first network connection is not available, create an addressed message addressed for the television receiver, wherein the addressed message indicates the timer. The processor-readable instructions that cause the one or more processors to notify each television receiver of the plurality of television receivers of the timer may include instructions that cause the one or more processors to, for each television receiver: if the first network connection is not available, cause the created addressed message that indicates the timer to be transmitted to the television receiver via a satellite-based communication network. The processor-readable instructions may further include instructions configured to cause the one or more processor to receive, from a television receiver separate from the plurality of television receivers, the timer. Each television receiver may use separate receiving hardware to receive television programming from a television service provider.

BRIEF DESCRIPTION OF THE DRAWINGS

A further understanding of embodiments of the invention may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
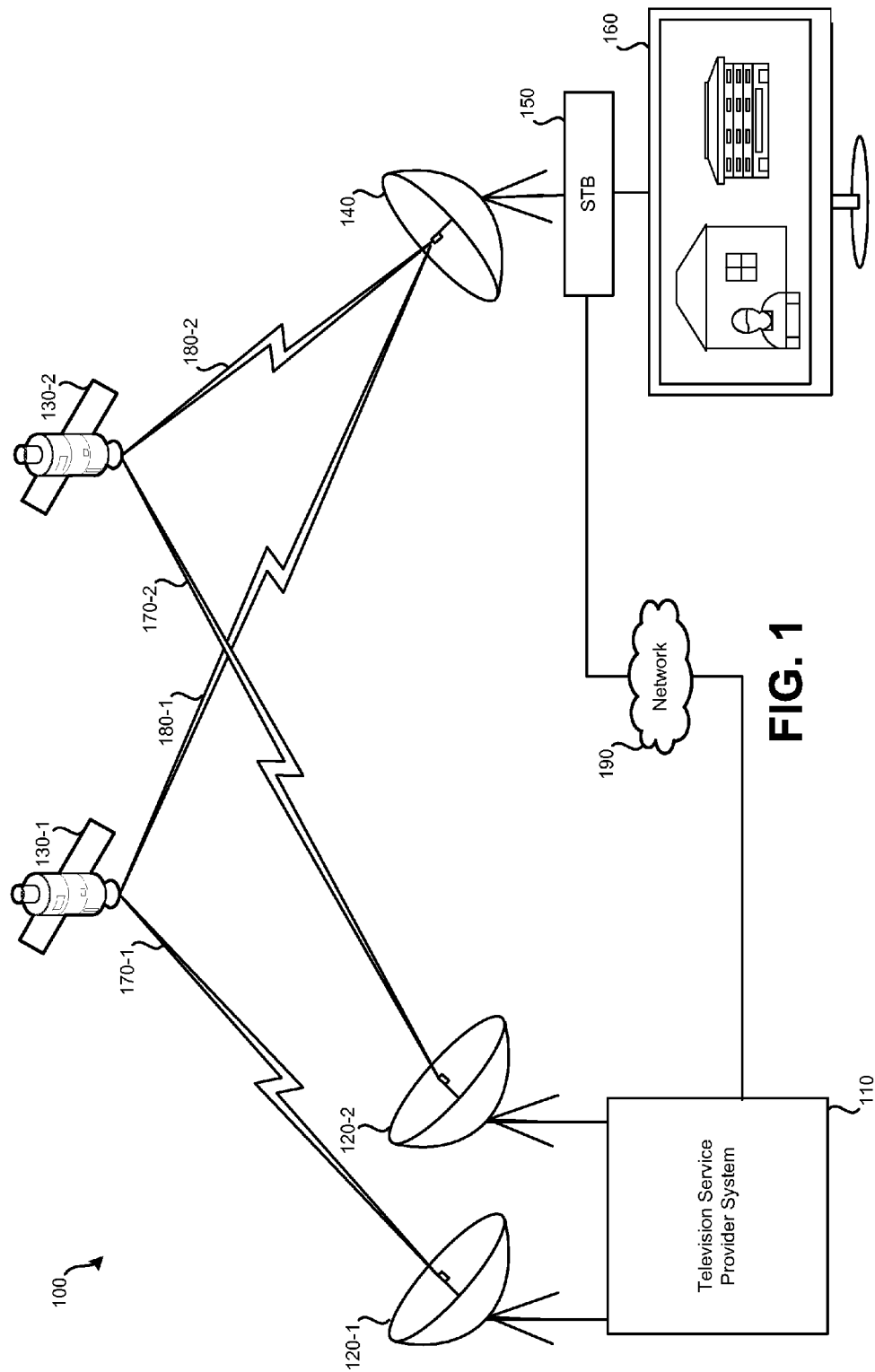
FIG. 1 illustrates an embodiment of a satellite television distribution system.

Within a house, building, apartment, or other form of location, a set-top box (STB) may be used to receive and decode television programming and/or record television programming for viewing at a later time. A Digital Video Recorder (DVR) of the STB may be used to digitally store television programming for presentation at a later time. Typically, a user may configure the STB using a timer, which indicates a television channel, a time period, and a date during which the user desires television programming to be recorded.

Such an arrangement may be useful if the user intends on watching the recorded television programming via the same STB (and, likely, the same television) at which the recording occurred. However, some users may move among locations having different STBs. For instance, some users may have multiple homes, such as a city home for during the week and a ski chalet for weekend getaways. While a user may configure a timer at a first STB at a first location (e.g., the city home), the user may desire to watch the recorded television programming at a second STB at a second location (e.g., the ski chalet). The STBs may not communicate directly. Rather than streaming or otherwise transferring the recorded television programming from the first STB at the first location to the second STB at the second location, it may be more efficient or otherwise more convenient to set the timer to initially record the television programming at each STB. As such, each set-top box (e.g., the set-top box in the city home and the set-top box at the ski chalet) may receive the timer and record the television programming indicated by the timer. While this example refers to two STBs at two locations, embodiments may be applied to more than two locations. For instance, a user having four geographically-distributed set-top boxes may configure a timer such that each of the four set-top boxes records the television programming indicated by the timer.

A timer may initially be set by a user. The user, using a set-top box or some other user device, such as a cell phone or tablet computer, may specify television programming that the user desires to record. The user may select a television program from an Electronic Programming Guide (EPG) or may specify a television channel, a time period, and a date. Via an Internet connection, this timer may be transmitted to a timer management computer system, which may be operated by the television service provider. At the television service provider, a database may be stored that indicates STBs that are associated with the user. For instance, each set-top box linked with the user's account may be identified. Alternatively, a group of STBs defined by the user (which may represent only some of the STBs associated with the user's account and/or may include STBs associated with other user accounts) may be identified.

Each STB linked with the user's account or in the group defined by the user may attempt to be communicated with by the timer management system. As a first attempt, the timer management system may try using an internet connection (e.g., via a cable network) to communicate with each STB. If successful, the timer management system may provide the timer, thus programming the STB to record the television programming indicated by the timer. However, if the internet connection is not available for a STB linked with the user's account or group, the timer management system may attempt to use a different communication path to communicate with the STB. If the STB receives television channels via a satellite-based distribution system, an indication of the timer may be sent via satellite to the STBs that were unavailable via the internet connection. The timer management system may create an entitlement management message (EMM) that is addressed to a specific STB linked with the user's account or group. This EMM may be transmitted via the television service provider's satellite-based distribution system to a large number of STBs, including those not associated with the user. Only the intended STB may respond to the EMM due to an address (e.g., a serial number of a smart card of the STB) being present within the EMM; other STBs may ignore the EMM. The EMM may be transmitted to the STB via satellite on one or more transponder streams that are received by the STB. For instance, the EMM may be transmitted on every transponder stream that is available to the STB to increase the likelihood that the STB will receive the EMM. These transponder streams may be the same transponder streams that are used to distribute the television programming to STBs. As such, the timer is received by the STB via a same transponder stream as television programming. In response to receiving the EMM, the STB may configure itself to record the television programming indicated by the timer. An EMM may be more generally referred to as an "addressed message." An addressed message refers to a message that is addressed to a particular television receiver (or a group of particular television receivers). Such an addressed message is ignored by television receivers not associated with the address indicated in the received addressed message.

FIG. 1 illustrates an embodiment of a satellite television distribution system 100. Satellite television distribution system 100 may include: television service provider system 110, satellite transmitter equipment 120, satellites 130, satellite dish 140, set-top box 150, and television 160. Alternate embodiments of satellite television distribution system 100 may include fewer or greater numbers of components. While only one satellite dish 140, set-top box 150, and television 160 (collectively referred to as "user equipment") are illustrated, it should be understood that multiple (e.g., tens, thousands, millions) instances of user equipment may receive television signals from satellites 130. For example, a particular person may have user equipment at multiple homes or other locations.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
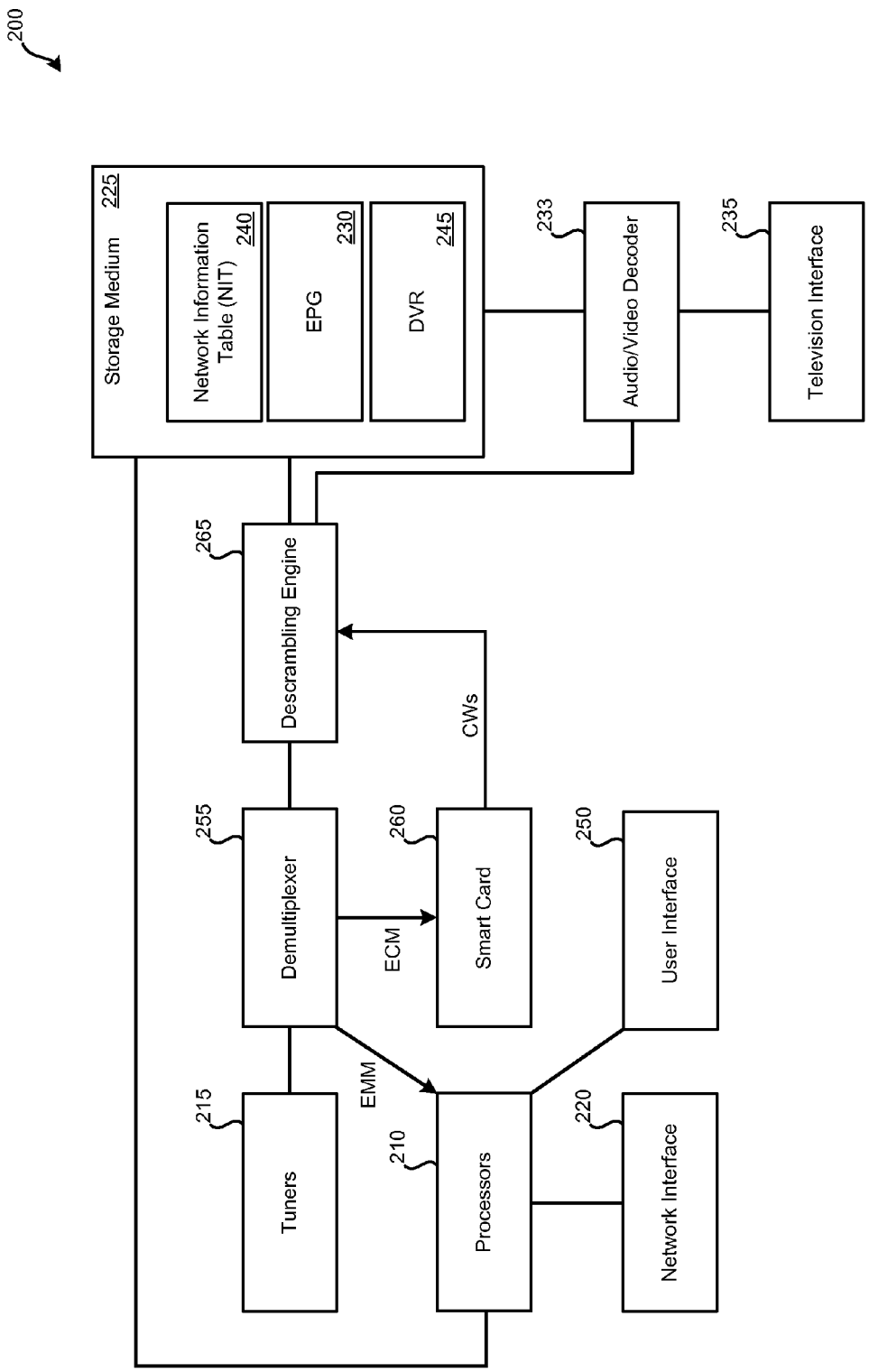
FIG. 2 illustrates an embodiment of a set-top box (STB).

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional detail of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. STB 150 may decode the received transponder stream. As such, depending on which television channel(s) are desired, a transponder stream from a different satellite (or a different transponder of the same satellite) may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190. Not all STBs may be able to communicate via network 190. For example, even if a STB is capable of communicating using network 190, communication using network 190 may require that the user has an active account with an internet service provider. Accordingly, some STBs may only be able to receive data from satellites 130 via receiving equipment such as satellite dish 140. In other situations, while a user may have an active ISP account, such as via a fiber, cable, or DSL internet connection, equipment failure may occur. For instance, a router through which STB 150 connects to network 190 may fail or be in need of resetting.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

Figure 1B:
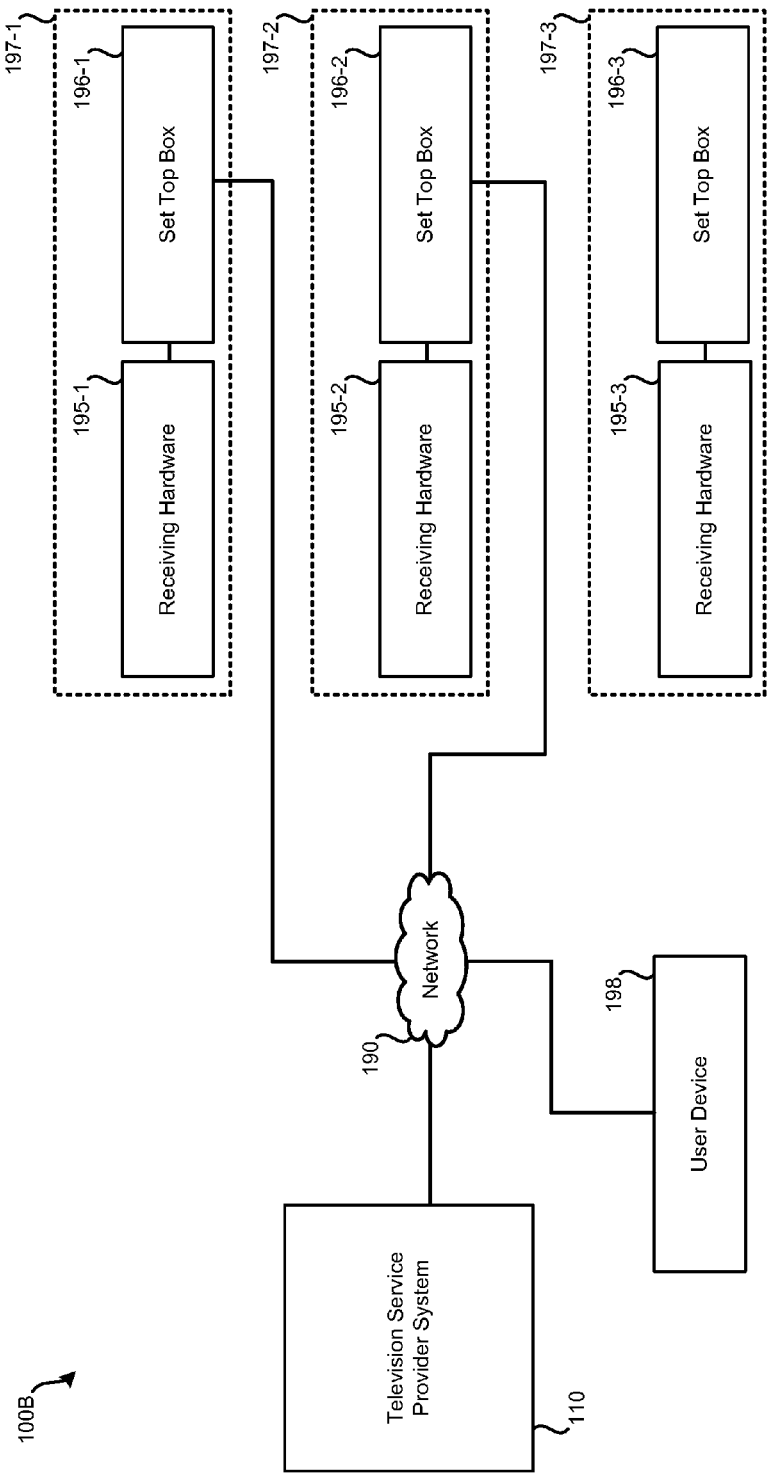
FIG. 1B illustrates an embodiment of a satellite television distribution system including geographically-distributed set-top boxes.

While FIG. 1 illustrates a single STB 150 in communication with television service provider system 110, it should be understood that many STBs may be in communication with television service provider system 110. FIG. 1B illustrates an embodiment of a satellite television distribution system including multiple geographically-distributed set-top boxes. Each of STBs 196 may be in communication with a television service provider, such as television service provider via network 190 and/or satellites 130.

Each set-top box of set-top boxes 196 may be associated with a particular user account. As such, a single user may pay a monthly subscription fee for television service received using set-top boxes 196. Set-top boxes 196 along with receiving hardware 195 (which may include a satellite dish) may be geographically distributed from each other. As such, set-top box 196-1 may be located at a different structure than set-top box 196-2. For instance, geographic location 197-1 may be in a different state than geographic location 197-2. Each set-top box of set-top boxes 196 may use receiving hardware separate from each other set-top box of set-top boxes 196 to receive television programming. For instance, each of set-top boxes 196 may be associated with different satellite dishes to receive television programming. By each set-top box 196 being located at different geographic locations, at minimum this means that each of set-top boxes 196 is present in separate structures (e.g., homes, buildings, offices) than the other set-top boxes of set-top boxes 196. In some embodiments, one or more of STBs 196 may be located in the same structure and/or may use the same receiving hardware. For example, a timer may be set at multiple STBs within a house such that each STB records the same television programming.

Each of set-top boxes 196 may be configured to receive television programming via receiving hardware 195. Some or all of set-top boxes 196 may be configured to communicate with television service provider system 110 via network 190. In some embodiments, while a set-top box of set-top boxes 196 may be capable of using network 190 to communicate with television service provider system 110, a network connection may not necessarily be available to the set-top box. For instance, a user may not have connected a particular set-top box of set-top boxes 196 to network 190. As another example, the user may not have an active account with an internet service provider for a particular geographic location, such as geographic location 197-3. As yet another example, while under normal operating conditions, a network connection between a set-top box of set-top boxes 196 and network 190 may exist; however, a failure may occur, such as a router through which the set-top box communicates being nonfunctional. Accordingly, some or all of set-top boxes 196 may be incapable of communicating with television service provider system 110 via network 190. In the example of FIG. 1B, STBs 196-1 and 196-2 can communicate with television service provider system 110 via network 190, but STB 196-3 cannot.

When a connection between a set-top box of set-top boxes 196 and television service provider system 110 is available via network 190, it may be possible for a set-top box to send data to television service provider system 110. For instance, a user may create a timer using a set-top box of set-top boxes 196. Creation of a timer may include a user providing a television channel, a time, and the date during which recording of videos to occur. In some embodiments, creation of a timer may involve the user selecting a television program from electronic programming display presented by a set-top box. Additionally or alternatively, a timer may include a program identifier that can be used by a STB to determine the appropriate time period, date, and television channel to record. A such a timer may identify television programming to be recorded using: a program identifier; and/or a time period, a date, and a television channel number.

Additionally, user device 198 may communicate with television service provider system 110 via network 190. User device 198 may represent a device through which a user may set a timer for recording of television programming. For example, user device 198 may be a mobile device, such as a cellular phone or tablet computer. A timer created using user device 198 may be transmitted to television service provider system 110 via network 190.

FIG. 1B illustrates three STBs that are geographically separated from each other and use separate receiving hardware to receive television programming. It should be understood that in other embodiments, some other number of STBs may be present.

FIG. 2 illustrates a block diagram of an embodiment of a set-top box 200. STB 200 may be STB 150 of FIG. 1 and/or STB 196 of FIG. 1B, or may be incorporated as part of a television, such as television 160 of FIG. 1. STB 200 may include: processors 210, tuners 215, network interface 220, non-transitory computer-readable storage medium 225 (storage medium, for short), electronic programming guide (EPG) 230, television interface 235, networking information table (NIT) 240, digital video recorder (DVR) 245, user interface 250, demultiplexer 255, smart card 260, and/or descrambling engine 265. In other embodiments of STB 200, fewer or greater numbers of components may be present. It should be understood that the various components of STB 200 may be implemented using hardware, firmware, software, and/or some combination thereof. For example, EPG 230 may be executed by processors 210.

FIG. 2 illustrates an embodiment of set-top box 200, which may typically be in the form of a separate device configured to be connected with a presentation device, such as a television. Embodiments of STB 200 may also be referred to as a "television receiver." In addition to being in the form of an STB, a television receiver may be incorporated as part of another device, such as a television. For example, a television may have an integrated television receiver (which does not involve an external television receiver being coupled with the television). A television receiver may contain some or all of the components of STB 200 and/or may be able to perform some or all of the functions of STB 200. Accordingly, instances in this document referring to an STB and steps being performed by a STB may also be performed, more generally, by a television receiver.

Processors 210 may include one or more general-purpose processors configured to perform processes such as tuning to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing descrambling. It should be understood that the functions performed by various modules of FIG. 2 may be performed using one or more processors. As such, for example, functions of descrambling engine 265 may be performed by processor 210.

Tuners 215 may include one or more tuners used to tune to television channels, such as television channels transmitted via satellite or cable. Each tuner contained in tuners 215 may be capable of receiving and processing a single stream of data from a satellite transponder (or a cable RF channel) at a given time. As such, a single tuner may tune to a single transponder (or cable RF channel). If tuners 215 include multiple tuners, one tuner may be used to tune to a television channel on a first transponder for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, STB 150 may be able to communicate with television service provider system 110 via network 190, such as the Internet. This communication may be bidirectional: data may be transmitted from STB 150 to television service provider system 110 and from television service provider system 110 to STB 150. Referring back to FIG. 2, network interface 220 may be configured to communicate via one or more networks, such as the Internet, to communicate with television service provider system 110 of FIG. 1. Information may be transmitted and/or received via network interface 220. Referring to timers, if a user uses set-top box 200 to create a timer, network interface 220 may be used to transmit the timer to a timer management computer system. Further, network interface 220 may be used to receive the timer from the timer management computer system. If network interface 220 can properly communicate with the timer management computer system via the Internet, network interface 220 may periodically ping the timer management computer system or some other computer system of the television service provider so that the television service provider is aware of the network connection between STB 200 and the television service provider. In some embodiments, STB 200 may periodically use network interface 220 to check the timer management computer system for any new timers.

Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG 230, NIT 240, and/or DVR 245. Recorded television programs may be stored using DVR 245 of storage medium 225.

EPG 230 may store information related to television channels and the timing of programs appearing on such television channels. EPG 230 may be stored using storage medium 225, which may be a hard drive. EPG 230 may be used to inform users of what television channels or programs are popular and/or provide recommendations to the user. EPG 230 may provide the user with a visual interface displayed by a television that allows a user to browse and select television channels and/or television programs for viewing and/or recording via DVR 245. Information used to populate EPG 230 may be received via network interface 220 and/or via satellites, such as satellites 130 of FIG. 1 via tuners 215. For instance, updates to EPG 230 may be received periodically via satellite. EPG 230 may serve as an interface for a user to control DVR 245 to enable viewing and/or recording of multiple television channels simultaneously.

Audio/video decoder 233 may serve to convert encoded video and audio into a format suitable for output to a display device. For instance, audio/video decoder 233 may receive MPEG video and audio from storage medium 225 or descrambling engine 265 to be output to a television. Audio/video decoder 233 may convert the MPEG video into a format appropriate to be output to a television or other form of display device and audio into a format appropriate to be output to speakers, respectively.

Television interface 235 may serve to output a signal to a television (or another form of display device) in a proper format for display of video and playback of audio. As such, television interface 235 may output one or more television channels, and stored television programming from storage medium 225 (e.g., DVR 245 and/or information from EPG 230) to a television for presentation.

The network information table (NIT) 240 may store information used by set-top box 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by STB 200 using storage medium 225. Information that may be present in NIT 240 may include: television channel numbers, a satellite identifier, a frequency identifier, a transponder identifier, an ECM (entitlement control message) PID (packet identifier), one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to lookup the audio PIDs and video PIDs in another table.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and STB 200 may be able to handle this reassignment as long as NIT 240 is updated.

TABLE 1

| Channel | Satellite | Transponder | ECM PID | Audio PIDs | Video PID |
|---------|-----------|-------------|---------|------------|-----------|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3. Video and/or audio for different television channels on different transponders may have the same PIDs. Such television channels may be differentiated based on which satellite and/or transponder a tuner is tuned to.

Digital Video Recorder (DVR) 245 may permit a television channel to be recorded for a period of time at a particular time/date. DVR 245 may receive and store timers that are used by processors 210 to determine when a television channel should be tuned to and recorded to DVR 245 of storage medium 225. In some embodiments, a limited amount of storage medium 225 may be devoted to DVR 245. Timers may be set by the television service provider and/or one or more users of the STB. DVR 245 may be configured by a user to record particular television programs. Whether a user directly tunes to a television channel or a DVR 245 tunes to a first television channel, NIT 240 may be used to determine the satellite, transponder, ECM PID (packet identifier), audio PID, and video PID.

User interface 250 may include a remote control (physically separate from STB 200) and/or one or more buttons on STB 200 that allow a user to interact with STB 200. User interface 250 may be used to select a television channel for viewing, viewing EPG 230, and/or programming DVR 245.

Referring back to tuners 215, television channels received via satellite (or possibly cable) may contain at least some encrypted data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID) which, in combination with NIT 240, can be determined to be associated with a particular television channel. Particular data packets, referred to as entitlement control messages (ECMs), may be periodically transmitted. ECMs may be encrypted; STB 200 may use smart card 260 to decrypt ECMs. Decryption of an ECM may only be possible if the user has authorization to access the particular television channel associated with the ECM. When an ECM is received by demultiplexer 255 and the ECM is determined to correspond to a television channel being stored and/or displayed, the ECM may be provided to smart card 260 for decryption.

When smart card 260 receives an encrypted ECM from demultiplexer 255, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260.

When an ECM is received by smart card 260, it may take a period of time for the ECM to be decrypted to obtain the control words. As such, a period of time, such as 2 seconds, may elapse before the control words indicated by the ECM can be obtained. Smart card 260 may be permanently part of STB 200 or may be configured to be inserted and removed from STB 200.

Demultiplexer 255 may be configured to filter data packets based on PIDs. For example, if a transponder data stream includes multiple television channels, data packets corresponding to a television channel that is not desired to be stored or displayed by the user may be ignored by demultiplexer 255. As such, only data packets corresponding to the one or more television channels desired to be stored and/or displayed may be passed to either descrambling engine 265 or smart card 260. Other data packets may be ignored. For each channel, a stream of video packets, a stream of audio packets and/or a stream of ECM packets may be present, each stream being identified by a PID. In some embodiments, a common ECM stream may be used for multiple television channels. Additional data packets corresponding to other information, such as updates to NIT 240, may be appropriately routed by demultiplexer 255.

Demultiplexer 255 may further be configured to route entitlement management messages (EMMs) that are addressed to the STB to smart card 260 and/or processors 210. An entitlement management message may include an address, such as a serial number of smart card 260, such that the EMM is only processed by the appropriate STB. EMMs that are received but are not addressed to the STB may be ignored or otherwise discarded. An EMM may be processed using processors 210 to determine whether a timer has been transmitted to the STB via a transponder stream. Such an EMM may be used by processors 210 to configure DVR 245 to record a particular television channel for a particular time period on a particular date. As such, an EMM may be received via a transponder stream that contains television programming. The EMM may be received as packetized data that is interspersed with audio and video television programming packets. An EMM may initially be processed by smart card 260, then passed to processors 210.

Descrambling engine 265 may use the control words output by smart card 260 in order to descramble video and/or audio corresponding to television channels for storage and/or presentation. Video and/or audio data contained in the transponder data stream received by tuners 215 may be scrambled. The video and/or audio may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (via DVR 245) and/or to audio/video decoder 233 for output to a television or other presentation equipment via television interface 235.

For simplicity, STB 200 of FIG. 2 has been reduced to a block diagram; commonly known parts, such as a power supply, have been omitted. Further, some routing between the various modules of STB 200 has been illustrated. Such illustrations are for exemplary purposes only. Two modules not being directly or indirectly connected does not indicate the modules cannot communicate. Rather, connections between modules of the STB 200 are intended only to indicate possible common data routing. It should be understood that the modules of STB 200 may be combined into a fewer number of modules or divided into a greater number of modules. Further, the components of STB 200 may be part of another device, such as a television. Also, while STB 200 may be used to receive, store, and present television channels received via a satellite, it should be understood that similar components may be used to receive, store, and present television channels via a cable network.

Figure 3:
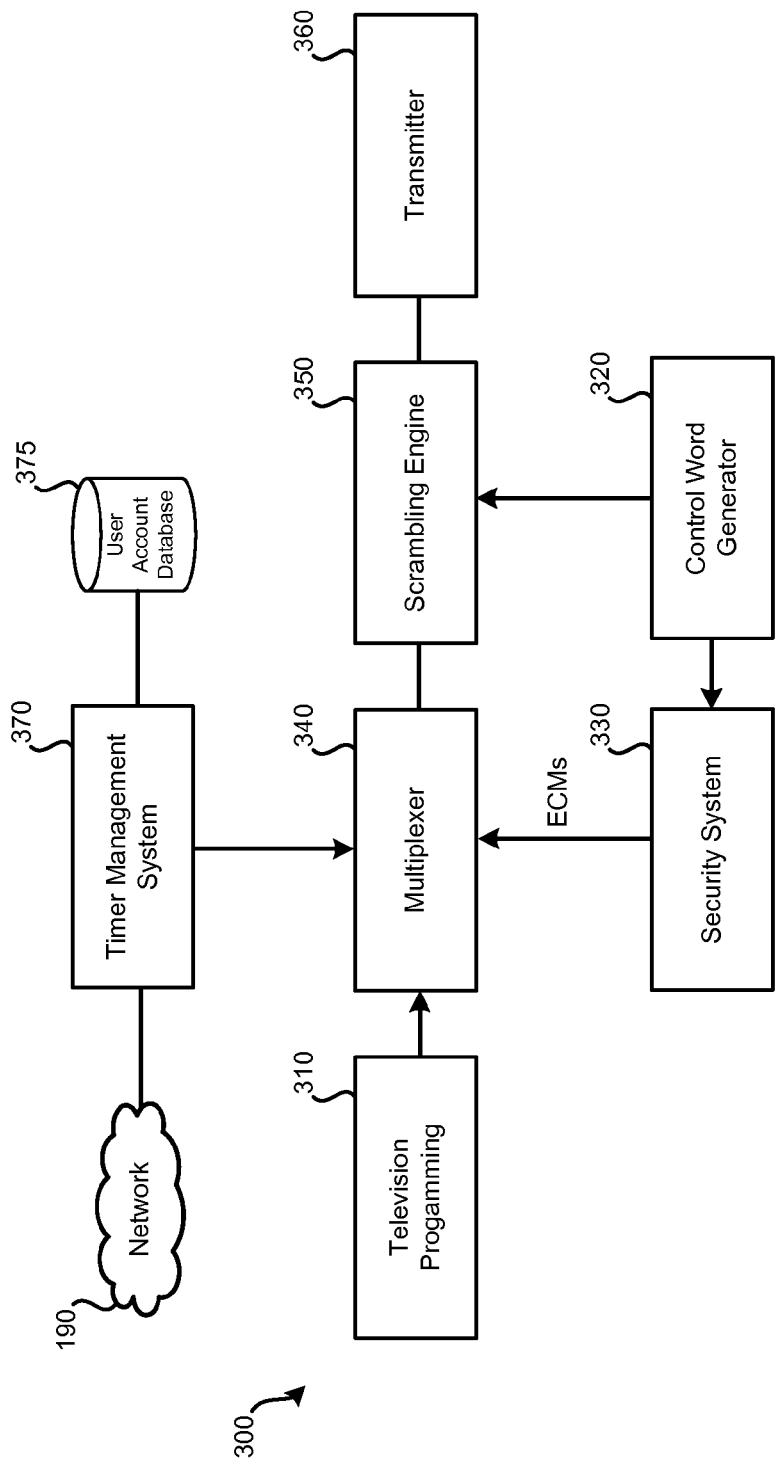
FIG. 3 illustrates an embodiment of a television service provider system.

FIG. 3 illustrates an embodiment of a television service provider system 300. Television service provider system 300 may be part of television service provider system 110 of FIG. 1. As such, before data is transmitted to set-top boxes via satellite, television service provider system 300 may be used to scramble video and/or audio packets to prevent unauthorized users from accessing television programming. Television service provider system 300 may include: television programming module 310, control word generator 320, security system 330, multiplexer 340, scrambling engine 350, transmitter 360, timer management system 370, and user account database 375.

Television programming module 310 may receive television channels from multiple different sources, such as directly from the networks that produced the content on the television channels. Each television channel that is to be transmitted on a particular transponder stream via a transponder of the satellite may be provided to multiplexer 340. Multiplexer 340 may create a digital stream of data packets containing the video, audio, and other data, such as ECMs, to be transmitted on the transponder data stream. The data stream, which includes video and/or audio data packets that are not scrambled, may be passed to scrambling engine 350. Scrambling engine 350 may use a control word to scramble video or audio present in a data packet. Some audio and video packets may also pass through with no scrambling, if desired by the television service provider.

Control word generator 320 may generate the control word that is used by scrambling engine 350 to scramble the video or audio present in the data packet. Control words generated by control word generator 320 may be passed to security system 330, which may be operated by the television service provider or by a third-party security provider. The control words generated by control word generator 320 may be used by security system 330 to generate an ECM. Each ECM may indicate two control words. The control words indicated may be the current control word being used to scramble video and audio, and the control word that will next be used to scramble video and audio. Security system 330 may output an ECM to multiplexer 340 for transmission to subscribers' set-top boxes. Each data packet, whether it contains audio, video, an ECM, or some other form of data, may be associated with a particular PID. This PID may be used by the set-top box in combination with the networking information table to determine which television channel the data contained within the data packet corresponds. After video and audio contained within data packets have been scrambled by scrambling engine 350, the transponder data stream may be transmitted by transmitter 360 to a satellite, such as satellite 130-1 of FIG. 1, for relay to subscribers' set-top boxes, such as STB 150. Accordingly, the transponder data stream transmitted by transmitter 360 contains scrambled video packet stream and audio packet stream and also contains an encrypted ECM packet stream which contains the control words necessary to descramble the scrambled video and audio packets.

Timer management system 370, which may include one or more computer systems (e.g., servers), may be configured to receive timers from users via network 190. The timers received by timer management system 370 via network 190 may be received from STBs and/or other user devices, such as mobile phones or tablet computers. A timer may include an indication of the associated user account. The timer may also include an indication of which set-top boxes associated with the user account should also record the television programming indicated by the timer.

Timer management system 370 may be configured to access user account database 375. User account database 375 may indicate multiple user accounts and the set-top boxes associated with each user account. For a timer to be used to program a DVR timer at another set-top box, it may be necessary for each set-top box to be linked with the user account in user account database 375. Table 1 provides exemplary entries from user account database 375. In the embodiment of Table 1, serial numbers of smart cards are used to identify linked STBs; other identifiers may be used in other embodiments.

TABLE 1

| User Account | Linked STBs |
|---|---|
| 32094839 | 1299933849483, 1299933664092, 1299239230302 |
| 32093454 | 4839483939333 |
| 32092213 | 2908548945944, 0213932039320, 1000239203939, 2229102327722 |
| 30092303 | 9123823922285, 1118329338557 |
| 59348839 | 2727131212238, 8142761342712, 2727131216676, 783421120999 |

As shown in Table 1, varying numbers of STBs may be linked with a particular user account. The STBs linked with the user account may be geographically scattered, such as by being located in different structures (e.g., different homes) and using separate receiving equipment (e.g., separate satellite dishes) to receive television programming via one or more satellite transponder streams.

Timer management system 370, upon receiving a timer from a user (via either a STB or some other user device) via network 190, may determine which other STBs associated with the user account are to receive the timer using user account database 375. By receiving an identifier of the user's account or, if the timer is received from a set-top box by using the serial number of the STB's smart card, the other set-top boxes associated with the user's account may be determined using user account database 375.

As part of user account database 375, data may be stored about individual set-top boxes. For instance, IP addresses for each set-top box, if available, may be stored in the user account database 375 along with an indication of whether the set-top box has recently been in communication with timer management system 370. The indication may be based on a predetermined time threshold, such as one day. In some embodiments, set-top boxes may be configured to periodically check timer management system 370 via network 190 to determine if any timers have been set that should be acquired by the STB. For instance, a STB may be configured to contact timer management system 370 via network 190 once every minute, every five minutes, every hour, every eight hours, or at some other interval of time (e.g., an interval of time between one minute and twenty-hour hours). For instance, the STB may periodically contact the timer management server so that a connection through a firewall stays open and the timer management server can push a timer to the STB when the timer is set. In other embodiments, a STB does not periodically check with timer management system 370 for timers, but rather timer management system 370 sends requests to STBs that are to receive a timer. Table 2 illustrates an embodiment of the table which may be stored as part of user account database 375 that indicates statuses for particular set-top boxes.

TABLE 2

| STB | IP Address | Recent Contact with Timer Management System? |
|---|---|---|
| 1000239203939 | 192.548.3.1 | y |
| 7834211209992 | 132.348.343.41 | n |
| 4839483939333 | N/A | n |

In some embodiments, IP addresses may not be available for some or all set-top boxes. Such set-top boxes may not be connected with network 190. Whether a set-top box has been in recent communication with timer management system may be used to determine whether timer management system 370 will attempt to send a timer to the set-top box via network 190.

Upon receiving a timer from either a set-top box or some other user device, timer management system 370 may determine one or more (other) set-top boxes to which the timer should be distributed. For set-top boxes that are expected to be available via network 190, timer management system 370 may push the timer to the set-top boxes or may store the timer such that when the set-top box contacts timer management system 370, the timer is retrieved. For set-top boxes that are determined to be unavailable via network 190, timer management system 370 may create an EMM for the set-top box that indicates an address of the STB (e.g., a serial number of a smart card) and the time. The EMM may be sent by timer management system 370 to multiplexer 340. The EMM may be transmitted as part of one or more transponder streams to one or more satellites via transmitter 360. In some embodiments, the EMM may be transmitted as part of each transponder stream that is sent to transmitter 360. The EMM may be transmitted by transmitter 360 via one or more transponder streams to one or more satellites, which then distribute the EMM to all of the set-top boxes in a geographical area (such as, all of the set-top boxes in a country or region). As such, many STBs, including those associated with other users, may receive the EMM. Each STB that is not associated with the address of the STB may ignore the EMM once it has been determined the EMM is not addressed to that STB. As such, while a large number of set-top boxes may receive the EMM, only the set-top box associated with the address indicated in the EMM may process the EMM and set a timer in response to the EMM. An EMM may be sent for each STB associated with the user account that could not be contacted via network 190. In some embodiments, EMMs are sent to each STB at which the timer is to be set, and network 190 is used for receiving timers by timer management system 370, but not sending timers.

For simplicity, television service provider system 300 of FIG. 3 has been reduced to a block diagram; other common components have been omitted. Further, some routing between the various modules of television service provider system 300 has been illustrated. Such illustration is for exemplary purposes only. Regardless of whether two modules are directly or indirectly connected, the modules may be able to communicate. Connections between modules are intended only to indicate possible common routing. It should be understood that the modules of television service provider system 300 may be combined into a fewer number of modules or divided into a greater number of modules.

Figure 4:
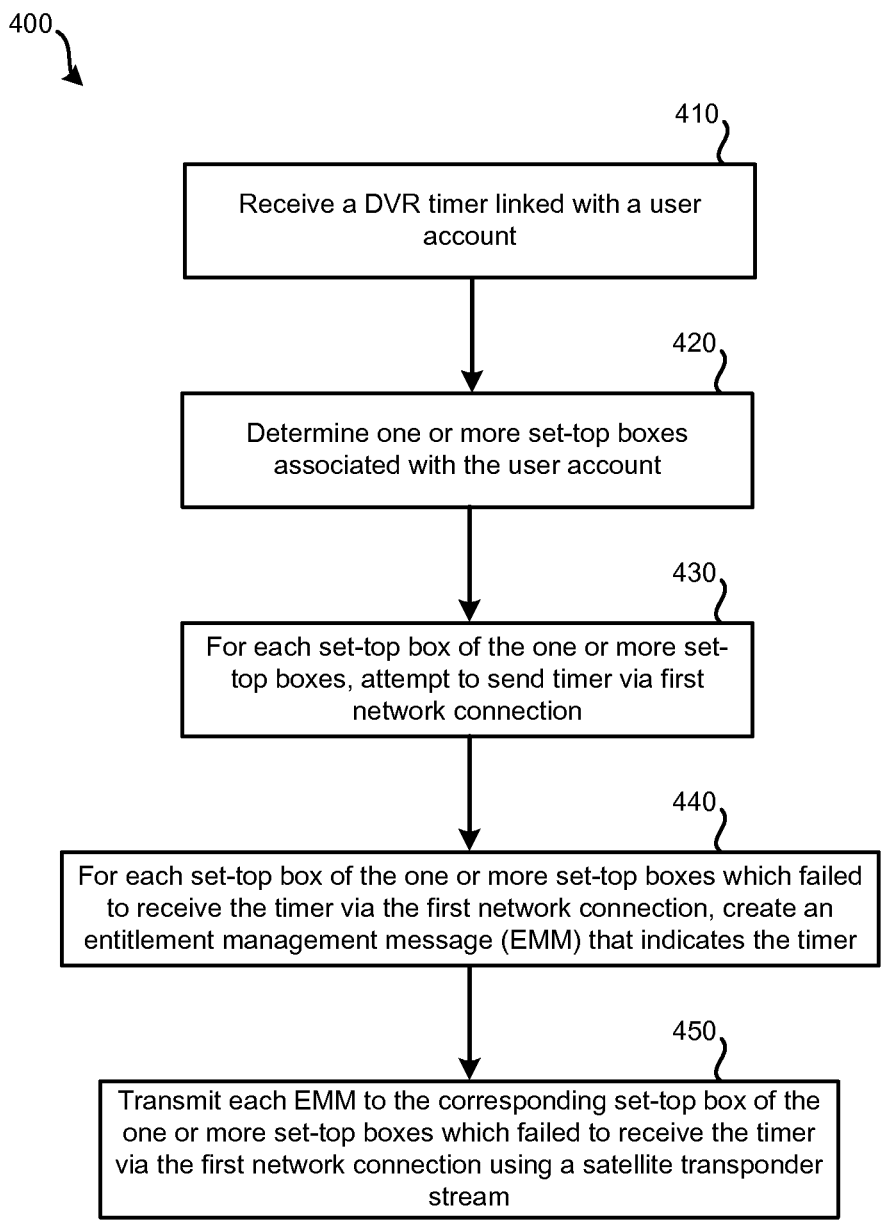
FIG. 4 illustrates an embodiment of a method for distributing a digital video recorder (DVR) timer to multiple, geographically-separated set-top boxes.

Various methods may be performed with the systems and devices of FIGS. 1-3. FIG. 4 illustrates an embodiment of a method 400 for distributing a DVR timer to multiple set-top boxes. Such set-top boxes may be geographically separated and use separate receiving hardware to receive television programming. Method 400 may be performed using the satellite television distribution system of FIGS. 1 and 1B, one or more STBs similar to STB 200 of FIG. 2, and/or the television service provider system of FIG. 3. Method 400 may also be performed using other forms of satellite television distribution systems, STBs, and/or television service provider systems. Some or all of the components of these systems and devices may be used in performing method 400. One or more computerized devices (e.g., computer systems) may be used in performing method 400. As such, means for performing method 400 includes some or all of the components of satellite television distribution systems 100 and 100B, STB 200, and/or television service provider system 300.

At step 410, a digital video recorder timer may be received. This digital video recorder timer may be received by a timer management system, such as timer management system 370 of FIG. 3. This timer management system may be operated by the television service provider. The timer, as received by the timer management system, may indicate a particular user account. In some embodiments, the timer management system may determine the user account based on one or more of: a username, IP address, MAC address, receiver identification number, username and password, and/or serial number of a smart card of a STB that is transmitted to the timer management system with the timer. In some embodiments, a user may not want the DVR timer to be set at every set-top box associated with the user's account. As such, the timer may specify specific set-top boxes associated with the user account (which may be less than the total number of set-top boxes associated with the user account) at which the timer is to be set. Various nicknames may be associated with the STBs for easy identification by the user, such as "vacation home" and "living room". The timer received at step 410 by the timer management system may be received via a network, such as the Internet. The timer may be received from a set-top box or some other user device, such as a cell phone or tablet computer. In order for a timer to be received from a set-top box, personal computer, cell phone, or tablet computer, it may be necessary for the set-top box, personal computer, cell phone, or tablet computer to have an Internet connection.

At step 420, the timer management system may determine one or more set-top boxes that are associated with the user account. To determine which set-top boxes are associated with the user account, the timer management system may consult a user account database, such as user account database 375 of FIG. 3. By consulting the user account database, the timer management system may be able to determine each set-top box that is associated with the user account. In some embodiments, the timer that is received by the timer management system may not specify other set-top boxes at which the timer is to be set. In such embodiments, the timer may be set at each set-top box associated with the user's account. In other embodiments, the received timer may indicate which set-top boxes associated with the user account are to receive the timer. In some embodiments, the user may be able to define subsets of STBs associated with the user's account. The user may submit a timer to the timer management system that indicates the predefined subset of STBs. For instance, a user may have three homes: a city home, a mountain home (within driving distance), and a beach home (which requires a flight), each having a STB. When submitting a timer from a cell phone, the user may have previously defined a subset of STBs to include only the mountain home and the city home. If the user is not planning on flying to visit the beach home anytime soon, the timer being enforced at the STB of the beach home may be superfluous.

At step 430, for each set-top box that has been determined by the timer management computer system to receive the timer, the timer management computer system may attempt to send the timer via a first network connection. This first network connection may be an Internet connection and may not involve using a satellite-based television channel distribution system. In some embodiments, rather than the timer management system actively sending the timer to each of the STBs, the timer may be made available for retrieval by the associated STBs. The timer management computer system may store an indication of which STBs have successfully received and/or retrieved the timer. At step 430, for set-top boxes that successfully received or retrieved the timer via the first network connection within a predefined period of time (e.g., 1 hour, 1 day, 1 week), method 400 may be complete. Once a STB has received the timer, the STB may set the timer and record the specified television programming on the identified television channel at the date and time indicated by the timer. However, one or more of the STBs at which the timer is to be set may not successfully have received or retrieved the timer via the first network connection within the predefined period of time.

At step 440, for each of the set-top boxes which did not receive the timer via the first network connection within the predefined period of time, an entitlement management message (EMM) may be created that is addressed to that set-top box. The EMM may be addressed to a specific set-top box based on a serial number of the smart card of the set-top box. The EMM may contain the timer or information sufficient to cause the STB to create the timer. At step 450, each of the created EMMs may be distributed via one or more transponder streams of a satellite television distribution network. As such, the EMMs are transmitted as packetized data that is interspersed with video and audio data for various television channels being distributed to a plurality of set-top boxes. Accordingly, the EMMs, while each being addressed to a specific set-top box, may be received by each set-top box that is receiving the transponder stream that contains the EMM. STBs that are not associated with the address indicated in the EMM may ignore the EMM. Therefore, only the STB to which the EMM is addressed processes the EMM and sets the timer. The EMM may be transmitted on each transponder stream which may be received by the set-top box. As such, regardless of which transponder stream the set-top box is tuned to, the EMM can be received by the STB. Such an EMM may be transmitted and provided to each set-top box that is to receive the timer and which could not be successfully communicated with via the first network connection. In some embodiments, an EMM may be addressed to multiple set-top boxes. As such, a single EMM may be transmitted that is addressed to each of the STBs that are to receive the timer. Whether the timer is received via the first network connection or in the form of an EMM via a satellite television distribution network, a set-top box may set the timer and record the television programming during the appropriate time period and date.

Figure 5:
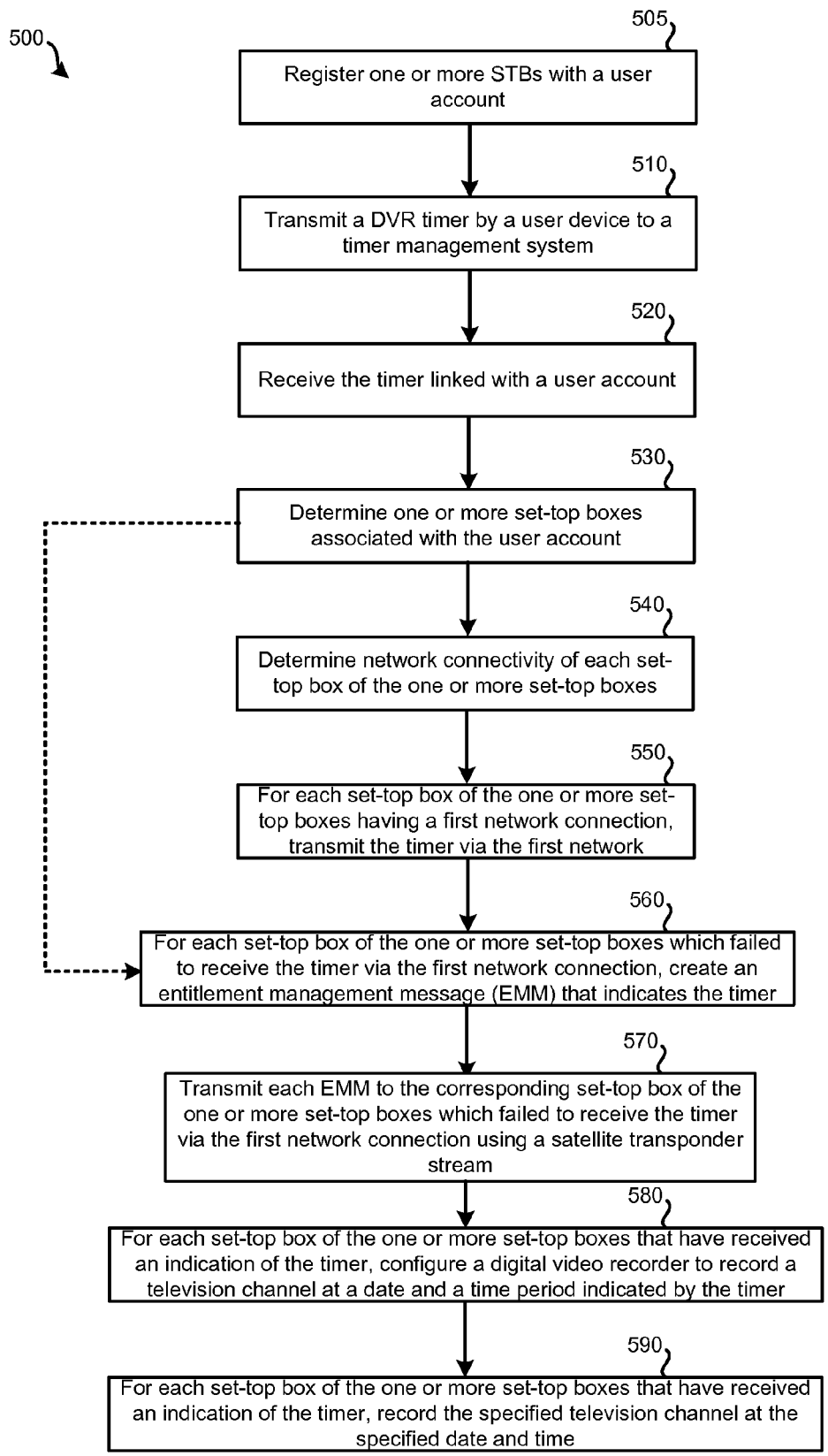
FIG. 5 illustrates another embodiment of a method for distributing a DVR timer to multiple, geographically-separated set-top boxes.

FIG. 5 illustrates an embodiment of a method 500 for managing a timer of a digital video recorder at multiple set-top boxes. Such set-top boxes may be geographically separated and use separate receiving hardware to receive television programming. Method 500 may be performed using the satellite television distribution system of FIGS. 1 and 1B, STBs similar to STB 200 of FIG. 2, and/or the television service provider system of FIG. 3. Method 500 may also be performed using other forms of satellite television distribution systems, STBs, and/or television service provider systems. Some or all of the components of these systems and devices may be used in performing method 500. One or more computerized devices (e.g., computer systems) may be used in performing method 500. As such, means for performing method 500 includes some or all of the components of satellite television distribution systems 100 and 100B, STB 200, and/or television service provider system 300. Method 500 may represent an alternate embodiment of method 400.

At step 505, at a timer management system, one or more STBs may be registered with a user account. When a timer is received with an indication of a user account, the timer may only be distributed to set-top boxes that are linked with the user account. A television service provider that operates a timer management system may have stored STB, smart card, and account information that can be used to determine which set-top boxes and/or smart cards are associated with which user accounts. In such embodiments, it may only be necessary for a user to register set-top boxes that are associated with another account. For example, if a husband has a user account with a television service provider for a first house and his wife has a second user account with the television service provider for a second house, it may be possible to register a set-top box associated with the second user account such that timers set using a set-top box at the first location and linked with the first user account can be sent to the set-top box at the second location. Accordingly, it may be possible for a set-top box to be associated with more than one user accounts. Further, such embodiments may allow timers to be shared among friends, relatives, or other persons (e.g., a user may be permitted to have timers set at the user's set-top box in accordance with timers set by a celebrity, so the user can watch the television program that the celebrity records).

At step 510, a user device, which may be a tablet computer, cellular phone, personal computer, or some other computerized device may be used to create and transmit a DVR timer to a timer management system. Instead of a user device, step 510 may involve the timer being created and sent from a set-top box. With the DVR timer, an indication of a user account may be included. The user account may be identified based on an IP address, a MAC address, a username, a serial number of a STB (e.g., a serial number of a smart card of the STB), or some other form of identifier that may be used to determine which user account the DVR timer is associated with. The DVR timer may also be transmitted with an indication of one or more set-top boxes at which a user desires the timer to be set. The user may only be permitted to set the timer at STBs linked with the user's account. In some embodiments, a timer may be set at all set-top boxes associated with the user's account. In some embodiments, the user may be able to select a subset of set-top boxes linked with the user's account at which the timer is set.

At step 520, the digital video recorder timer transmitted at step 510 may be received. This digital video recorder timer may be received by a timer management system, such as timer management system 370 of FIG. 3. This timer management system may be operated by the television service provider. The timer, as received by the timer management system, may indicate a particular user account. In some embodiments, the timer management system may determine the user account based on a username, IP address, MAC address, or serial number of a smart card of a STB that is transmitted to the timer management system with the timer. In some embodiments, a user may not want the DVR timer to be set at every set-top box associated with the user's account. As such, the timer may specify specific set-top boxes associated with the user account (which may be less than the total number of set-top boxes associated with the user account) at which the timers are to be set. The timer received at step 520 by the timer management system may be received via a network, such as the Internet. The timer may be received from a set-top box or some other user device, such as a cell phone or tablet computer. In order for a timer to be received from a set-top box, cell phone, or tablet computer, it may be necessary for the set-top box to have an Internet connection.

At step 530, the timer management system may determine one or more set-top boxes that are linked with the user account. To determine which set-top boxes are linked with the user account (and should therefore receive the timer), the timer management system may consult a user account database, such as user account database 375 of FIG. 3. By consulting the user account database, the timer management system may be able to determine each set-top box that is associated with the user account. Further, consulting a user account database may be used for confirming that the STBs at which the timer is to be set is linked with the user account. If the timer is initially received from a STB associated with the user's account, this STB may not receive the timer when it is distributed by the timer management system. In some embodiments of method 500, method 500 may proceed to step 560 in which the timer is sent via a satellite-based television programming distribution network to each STB determined to receive the STB. In other embodiments, method 500 proceeds to step 540 to initially attempt sending the timer to the determined STBs via a network connection other than the satellite-based television programming distribution network.

At step 540, the network connectivity of each determined set-top box with a first network may be determined at step 540. In some embodiments, determining the network connectivity may involve consulting a database to determine if each set-top box has successfully communicated with the timer management system via the first network, which may be the Internet, within a predefined period of time. For example, each STB may be configured to periodically contact the timer management system to determine if any timers are available for download. In some embodiments, the database may contain indication of whether a timer has been successfully sent to or retrieved by the set-top box via the first network previously. It should be understood that there are other methods for determining whether each of the set-top box contains network connectivity with the first network. For example, if the IP addresses of the set-top boxes are known, the timer management system may ping each set-top box to check network connectivity. In some embodiments, rather than checking network connectivity, the timer may be stored for each set-top box for a predefined period of time. During this predefined period of time, if a set-top box contacts the timer management system, the timer may be downloaded by the set-top box. For example, each set-top box may be configured to check for timers once every five minutes (other periods of time are possible). The timer management system may be configured to store a timer for 24 hours prior to attempting to send the timer to the set-top boxes via an alternate communication path. In some embodiments, if the time and date at which a timer is set for recording is approaching (e.g., within a predefined period of time), the timer may be sent via satellite in the form of an EMM to insure recording occurs as scheduled.

At step 550, for each of the set-top boxes that were determined at step 530 and that have a functioning connection with the first network, the timer may be transmitted to the set-top box via the first network. In some embodiments, step 550 may involve a set-top box of the determined set-top boxes contacting the timer management system and retrieving the timer. In other embodiments, this may involve the timer management system initially contacting the set-top box of the determined set-top boxes and sending the timer. In some embodiments, if, at step 540, a set-top box was determined to not have connectivity with the first network, step 550 may be skipped for that set-top box. In some embodiments, step 550 is attempted for each STB determined at step 530. If the timer has been successfully provided to a set-top box of the determined set-top boxes, an indication of the successful transmission may be stored by the timer management system. Further, an indication of unsuccessful transmissions may also be stored by the timer management system. Accordingly, following step 550, the timer management system has stored indications of which set-top boxes of the determined one or more set-top boxes that have and have not received or retrieved the timer.

At step 560, for each of the set-top boxes of the determined set-top boxes that did not receive the timer via the first network, an entitlement management message (EMM) may be created. This EMM may include an address of the set-top box and include the timer. The EMM may be configured to be transmitted via a television programming distribution network. This television programming distribution system may be uni-directional and satellite-based. Each set-top box, regardless of whether the set-top box has connectivity to the first network, may be expected to be able to receive an EMM via the television programming distribution network. Since each set-top box is configured to receive television programming, for the set-top box to be functional, it must be able to successfully receive data packets containing television programming from the television programming distribution system. Accordingly, if a set-top box is unable to receive an EMM, then the set-top box is also unlikely to be able to record television programming. At step 560, one or more EMMs may be created.

For example, if three set-top boxes were determined at step 530 and one of the set-top boxes was successfully sent to the timer via the first network connection at step 550, then two EMMs may be created at step 560. As another example, if three set-top boxes were determined at step 530 and none of the set-top boxes successfully received the timer via the first network connection at step 550, then three EMMs may be created at step 560, one for each set-top box. In some embodiments, it may be possible to create an EMM that is addressed to multiple set-top boxes. As such, a single EMM may be created that is addressed to the set-top boxes that did not receive the timer via the first network at step 560. A STB may be configured such that EMMs that indicate an address other than an address of the STB are ignored. Such an arrangement may be necessary for a satellite-based television distribution system because the EMM may be broadcast to a large number of set-top boxes in a geographic area. All of these set-top boxes may ignore the EMM except the STB indicated by the address of the EMM. The address of the EMM may be based on a serial number of the STB's smart card.

In embodiments where set-top boxes are configured to periodically contact the timer management system to retrieve any timers which may be stored and associated with the set-top box, an EMM may be created after a predefined period of time, such as 24 hours, in which the STB failed to contact the timer management system. Accordingly, a STB may be provided an amount of time to retrieve the timer before an EMM is created for the set-top box. In some embodiments, if the time and date at which a timer is set for recording is approaching (e.g., within a predefined period of time), the timer may be sent via satellite in the form of an EMM to insure recording occurs as scheduled. In some embodiments, such as an embodiment of method 500 illustrated by the dotted arrow in FIG. 5, rather than attempting to send the timer to the set-top box via the first network connection, an EMM is created for each STB regardless of connectivity with the first network. For example, if five set-top boxes are determined that are associated with the user account (and are each to receive the timer), an EMM may be created for each STB or a single EMM may be created that is addressed to each of the STBs.

At step 570, each of the created EMMs may be distributed via one or more transponder streams of a satellite television distribution network to the STBs. As such, the EMMs are transmitted as packetized data that is interspersed with video and audio data for various television channels being distributed to a plurality of set-top boxes. Accordingly, the EMMs, while each being addressed to a specific set-top box, may be received by each set-top box that is receiving the transponder stream that contains the EMM (e.g., all of the STBs in a region of the United States). Set-top boxes that are not associated with the address indicated in the EMM may ignore the EMM. Therefore, only the set-top box to which the EMM is addressed processes the EMM and sets the timer. The EMM may be transmitted on each transponder stream which may be received by the set-top box. As such, no matter which transponder stream the set-top box is tuned to, the EMM can be received by the STB. In some embodiments, if the timer is far enough in the future (e.g., not scheduled until at least the next day) the EMM may only be sent on a single transponder stream, to which the STB tunes on a periodic basis, such as once per day at a predefined time (e.g., 3 AM). If the timer is scheduled for recording sooner than the next scheduled predefined time, each transponder stream may be used to insure the STB receives the timer.

At step 580, regardless of whether the timer was received by each set-top box using the first network or via a satellite-based television distribution network in an EMM, each STB determined at step 530 may set a DVR timer to record television programming of the television channel indicated by the timer at the time and date indicated by the timer. In some embodiments, the timer may be re-occurring, such as to record television programming every Monday night on a particular channel at a particular time. At step 590, each of the set-top boxes determined at step 530 may record the television programming on the specified television channel at the specified time and date of the timer that was received via either the first network or an EMM via the satellite-based television programming distribution system.

In some embodiments, a timer distributed to one or more set-top boxes may result in a timer conflict. A timer conflict is a situation where a set-top box is configured to record multiple instances of television programming at the same time during which the set-top box does not have sufficient resources to record the multiple instances of television programming. For example, a set-top box may need to devote a tuner and decoding resources to each television channel to be recorded. In some situations, two or more instances of television programming that are to be recorded concurrently may cause a timer conflict. The amount of television programming to be concurrently recorded (or presented and recorded) that causes a timer conflict may vary by the model of the set-top box. For example, set-top boxes with five tuners may be able to record television programming across five television channels simultaneously, while a set-top box with two tuners may only be able to record television programming across two television channels simultaneously. All of the set-top boxes associated with a particular user account may not have the same level of capabilities. For example, a first STB associated with the user account may have three tuners while a second STB associated with the same user account located at a geographically remote location that uses separate receiving hardware to receive television programming may have five tuners.

Also, because a user can choose to set a timer at only a subset of his STBs (e.g., one), such a timer may result in a conflict even if the STBs of the user have the same number of tuners.

Figure 6:
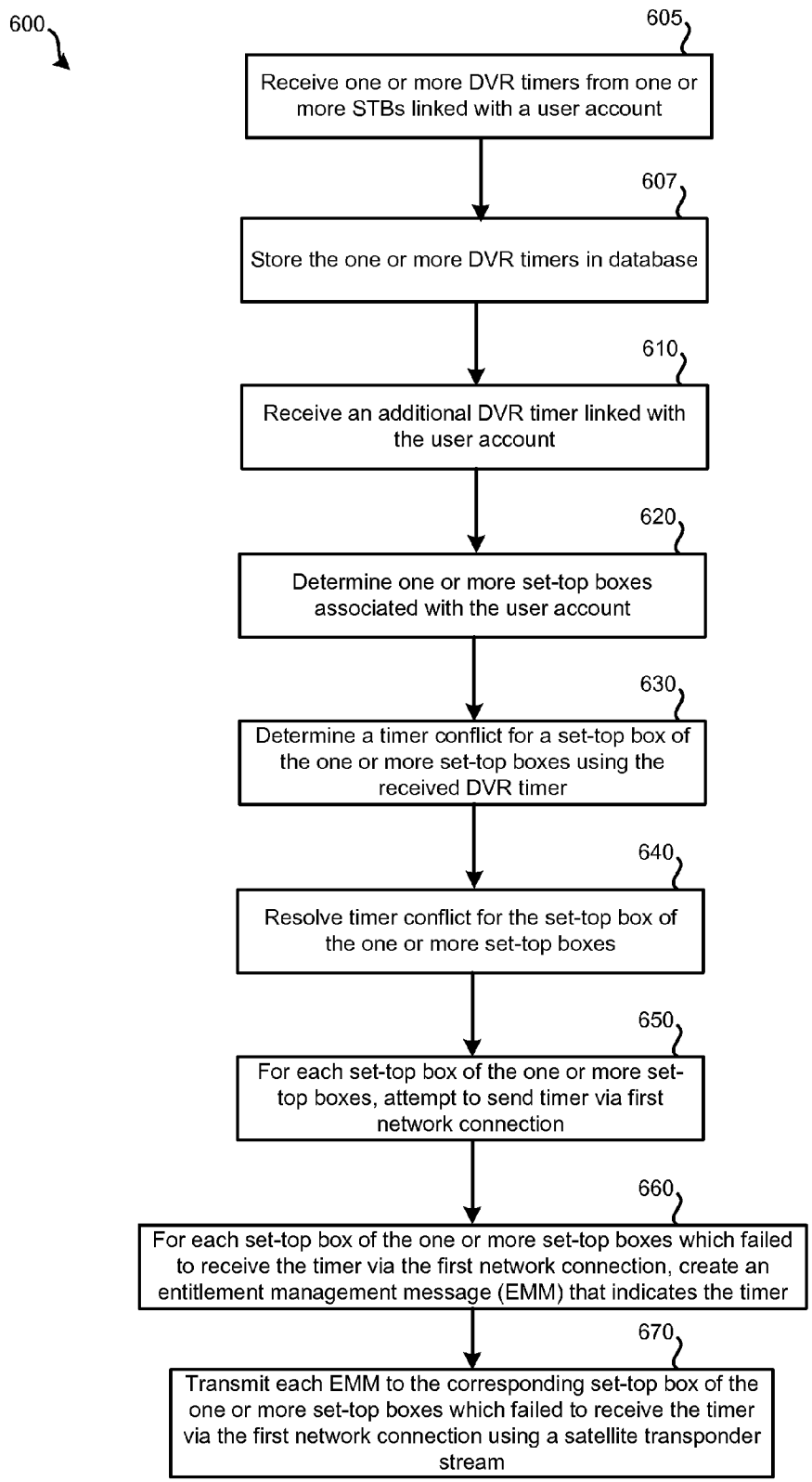
FIG. 6 illustrates an embodiment of a method for managing a timer conflict remote from one or more set-top boxes.

FIG. 6 illustrates an embodiment of a method 600 for managing a timer conflict remote from one or more set-top boxes. Method 600 may be performed using the satellite television distribution system of FIGS. 1 and 1B, STBs similar to STB 200 of FIG. 2, and/or the television service provider system of FIG. 3. Method 600 may also be performed using other forms of satellite television distribution systems, STBs, and/or television service provider systems. Some or all of the components of these systems and devices may be used in performing method 600. One or more computerized devices (e.g., computer systems) may be used in performing method 600. As such, means for performing method 600 includes some or all of the components of satellite television distribution systems 100 and 100B, STB 200, and/or television service provider system 300. The multiple set-top boxes that are used in performing method 600 may have varying capabilities. For instance, one set-top box associated with a user account may have more tuners and/or more decoding resources than another set-top box associated with the same user account. Some or all steps of method 600 may be incorporated with embodiments of previously described methods.

At step 605, the timer management system, such as timer management system 370 of FIG. 3, may receive one or more DVR timers from set-top boxes, which may be linked with a particular user account. A STB may be programmed to transmit the new timer to the timer management system 370 periodically, such as once per day, or whenever a new timer is programmed by a user. These DVR timers may be transmitted to the timer management system via a first network, which may be the Internet. In a satellite-based television distribution network, communication via the satellites may be unidirectional. As such, communication from a set-top box to a television service provider via a satellite may not be possible. Accordingly, an alternate connection, such as a broadband connection with the Internet, may be necessary for the set-top box to communicate with the television service provider.

At step 607, the timer management system may store the one or more DVR timers received at step 605 in a database. The database may store information about the timer (which may include a television channel, a date, and a time period), the make/model of set-top box, and the user account. As such, the database may store an indication of every timer programmed in at a set-top box that can transmit information to the timer management system.

At step 610, another digital video recorder timer may be received. This digital video recorder timer may be received by the timer management system from a STB associated with the user account or a user device associated with the user account. This timer management system may be operated by the television service provider. The timer, as received by the timer management system, may indicate a particular user account. In some embodiments, the timer management system may determine the user account based on a username, IP address, MAC address, or serial number of a smart card of a STB that is transmitted to the timer management system with the timer. The timer received at step 610 by the timer management system may be received via a network, such as the Internet. The timer may be received from a set-top box or some other user device, such as a cell phone or tablet computer. In order for a timer to be received from a set-top box, cell phone, or tablet computer, it may be necessary for the set-top box to have an Internet connection. This additional DVR timer received at step 610 may be added to the database that indicates the other one or more timers received at step 605 that is also linked with the set-top box.

At step 620, the timer management system may determine one or more set-top boxes that are associated with the user account. To determine which set-top boxes are associated with the user account, the timer management system may consult a user account database, such as user account database 375 of FIG. 3. By consulting the user account database, the timer management system may be able to determine each set-top box that is associated with the user account and/or which set-top boxes associated with the user account are to receive the timer. At step 620, the additional DVR timer received at step 610 may be added to a database, such as the user account database, which indicates other DVR timers of the determined one or more set-top boxes at step 620.

Such a database may be maintained for set-top boxes that have a functional connection to a first network connection, such as the Internet, that permits bidirectional communication. For set-top boxes that do not have a functional connection to the first network, timers may be stored at the database that were set at the STB by the time management system via an EMM. DVR timers set directly at a STB that does not have a network connection to transmit data to the timer management system may not be stored in the database. By inspecting the database for particular set-top boxes and accessing indication of the capabilities of the particular set-top box (e.g., the number of television channels that can be concurrently recorded by the set-top box), the timer management system may be able to determine if the DVR timer received at step 610 will create a conflict at one or more than one of the set-top boxes determined at step 620. For example, the database may indicate that one of the set-top boxes determined at step 620 already has three television channels scheduled for concurrent recording at the same time as the DVR timer received at step 610. No conflict may exist if that set-top box has sufficient resources to receive and decode four television channels concurrently. However, a timer conflict may exist if that set-top box only has sufficient resources to receive and decode three channels concurrently. In the exemplary embodiment of method 600 illustrated in FIG. 6, it is assumed that only one set-top box of the one or more set-top boxes determined at 620 has a timer conflict.

At step 640, the timer conflict for the set-top box determined at step 630 may be resolved. The timer conflict may be resolved based on priorities assigned to the DVR timers received at step 610 and one or more priorities assigned to the one or more DVR timers previously configured for the set-top box. These priorities may be determined by the timer management system or may have been defined by the user. For example, a numerical value may be assigned to the DVR timer as a priority level or a relative level, such as "high," "normal," or "low" may be assigned by the user. DVR timers with a higher relative level may be given priority over DVR timers with a lower relative level. DVR timers that still conflict after comparison of the priority level may be resolved based on when the timers were created. For instance, newer timers may be given priority.

In some embodiments, rather than the timer conflict being resolved by the timer management system based on priorities, the user may be contacted to determine which timer should be enforced and which should be ignored. The timer management system may transmit a query to the user device from which the DVR timer was received at step 610. The query may present the DVR timer received at step 610 and the previously programmed DVR timer(s) that conflict with the DVR timer received at step 610. The user may then be permitted to select which DVR timer(s) to enforce and which DVR timer(s) to ignore. The user selection may be enforced across each set-top box linked with the user's account or the user selection may only be enforced at the set-top box(es) that have the timer conflict.

At step 650, for each set-top box that has been determined by the timer management computer system to receive the timer and which is to receive the timer following the timer conflict resolution of step 640, the timer management computer system may attempt to send the timer via a first network connection. If the timer being transmitted at step 650 will override a timer already stored by the set-top box, an instruction may be included with the timer that indicates that the previously stored timer is to be ignored. The first network connection may be an Internet connection that permits bidirectional communication and may not involve using a satellite-based television distribution network. In some embodiments, rather than the timer management system actively sending the timer to each of the STBs, the timer may be made available for retrieval by the associated STBs. The timer management computer system may store an indication of which STBs have successfully retrieved the timer. Once a STB has received the timer, the STB may set the timer and record the specified television programming on the identified television channel at the date and time indicated by the timer. However, one or more of the STBs at which the timer is to be set may not successfully have received or retrieved the timer via the first network connection within the predefined period of time.

If a set-top box has a functional connection with the first network, it may be assumed that the timer management system has an indication of each timer set at the set-top box stored in the timer database. However, if the timer received by the set-top box via the first network connection at step 650 results in a timer conflict unknown to the timer management system, the set-top box may transmit such an indication to the timer management system such that the timer resolution of step 640 is then performed. In some embodiments, if conflict resolution is to be formed based on priorities, the timer conflict resolution may occur at the set-top box.

At step 660, for each of the set-top boxes which did not receive the timer via the first network connection within the predefined period of time, an entitlement management message (EMM) may be created that is addressed to the set-top box. The EMM may be addressed to a specific set-top box based on a serial number of the smart card of the set-top box. The EMM may contain the timer. The EMM of step 660 may only be created for set-top boxes for which the timers to be distributed following the timer conflict resolution of step 640 and for which the timer was not successfully sent via the first network connection of step 650. In some embodiments, rather than attempting to use a first network connection, timers are sent via an EMM distributed using a satellite-based television programming distribution system.

At step 670, each of the created EMMs may be distributed via one or more transponder streams of a satellite television distribution network. As such, the EMMs are transmitted as packetized data that is interspersed with video and audio data for various television channels being distributed to a plurality of set-top boxes. Accordingly, the EMMs, while each being addressed to a specific set-top box, may be received by each set-top box that is receiving the transponder stream that contains the EMM. Set-top boxes that are not associated with the address indicated in the EMM may ignore the EMM. Therefore, only the set-top box to which the EMM is addressed processes the EMM and sets the timer. The EMM may be transmitted on each transponder stream which may be received by the set-top box. In some embodiments, an EMM may be addressed to multiple set-top boxes. As such, a single EMM may be transmitted that is addressed to each of the STBs that are to receive the timer.

If an EMM is used to transmit the timer to a set-top box of step 670, the first network connection may not be functional for the set-top box. As such, the set-top box may not have any way of providing previously programmed timers to the timer management system. Accordingly, one or more timers may exist at the set-top box that have not been sent to and stored in a database of the timer management system. Therefore, timer conflict management may be required to be performed at the set-top box because the first network connection is not available. In some embodiments, preference is always given to a timer received via an EMM over timers configured locally at the set-top box. In other embodiments, the reverse is true: preference is always given to timers configured locally at the set-top box rather than timers received via an EMM. The EMM, in addition to including the timer, may include a priority. This priority may be used by the set-top box in performing timer conflict resolution. As such, if a timer is received via an EMM, a timer conflict may be resolved based on a priority indicated by the user for the DVR timer was provided at step 610 and one or more priorities set locally for the conclicting timers.

Figure 7:
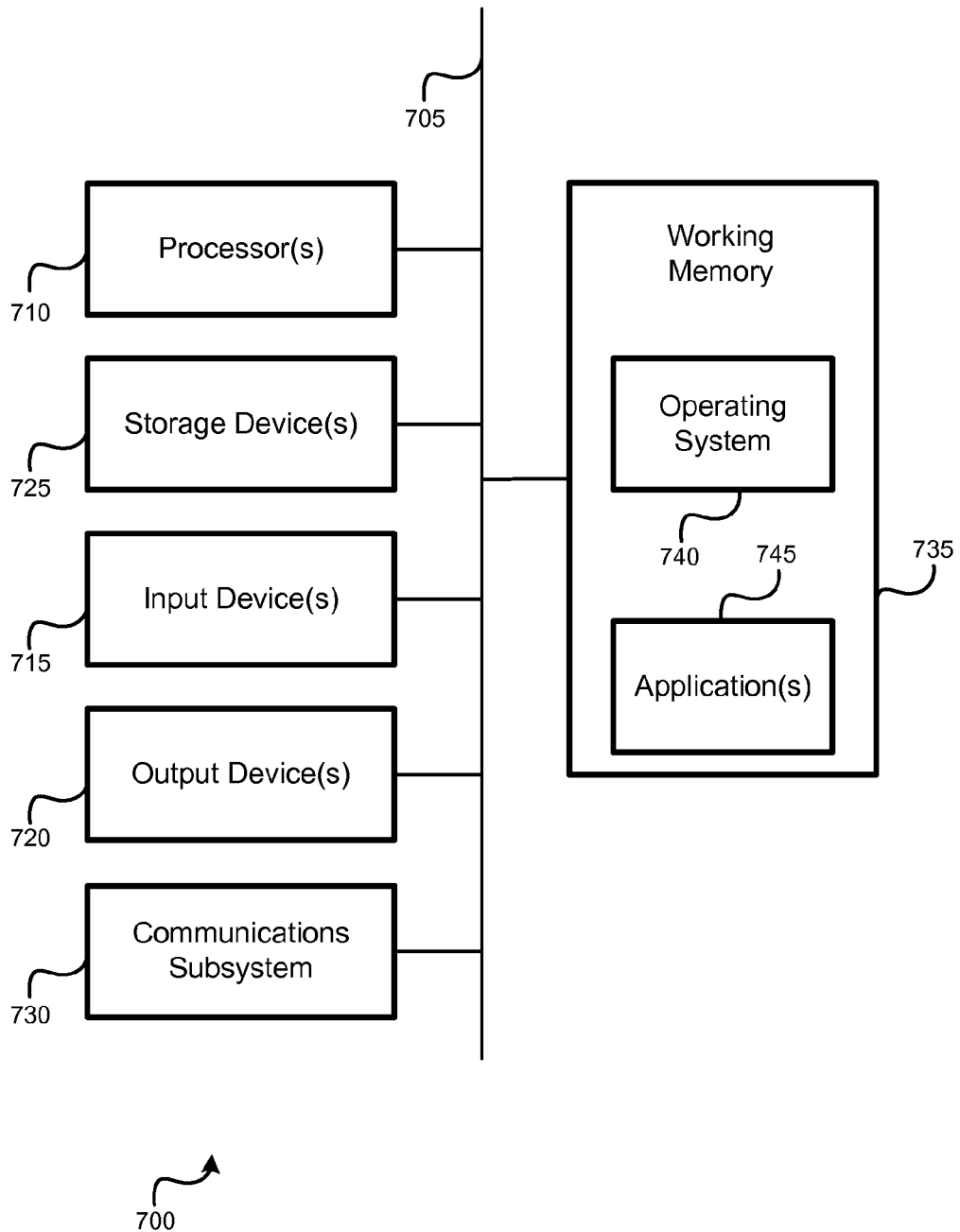
FIG. 7 illustrates an embodiment of a computer system.

One or more computer systems, such as the computer system illustrated in FIG. 7, may be incorporated as part of the previously-described computerized devices. For example, computer system 700 can represent some of the components of the mobile devices, television service provider system, user device, set-top boxes, timer management system, control word generator, scrambling engine, and/or any other component discussed in this application. FIG. 7 provides a schematic illustration of one embodiment of a computer system 700 that can perform the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include, without limitation, a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc., carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A system for managing a digital video recorder timer, the system comprising:
   a television receiver, wherein:
      the television receiver is linked with a user account; and
      the television receiver is configured to receive television programming from a satellite-based television provider distribution network; and
   a timer management computer system, configured to:
      receive a timer associated with the user account, wherein the timer specifies a television channel, a date, and a time period for recording; and
      based on the received timer, notify the television receiver of the timer, which comprises the timer management computer system being configured to:
         create an addressed message addressed to the television receiver for transmission via the satellite-based television provider distribution network, wherein the addressed message indicates the timer; and
         cause the addressed message to be transmitted to the television receiver via the satellite-based television provider distribution network; wherein, in response to being notified of the timer, the television receiver records the television channel at the date and the time period indicated by the timer.

2. The system for managing the digital video recorder timer of claim 1, the system comprising:
   a second television receiver configured to transmit the timer associated with the user account to the timer management computer system via the Internet, wherein the television receiver is a first television receiver.

3. The system for managing the digital video recorder timer of claim 1, wherein the timer is received by the timer management computer system from a device selected from the group consisting of:
   a mobile phone;
   a tablet computer;
   a laptop computer; and
   a desktop computer system.

4. The system for managing the digital video recorder timer of claim 1, the timer management computer system being further configured to determine the television receiver is linked with the user account.

5. The system for managing the digital video recorder timer of claim 1, wherein the addressed message is an entitlement management message (EMM).

6. The system for managing the digital video recorder timer of claim 1, wherein the television receiver is further configured to record television programming received via the satellite-based television provider distribution network in accordance with the timer indicated by the addressed message.

7. The system for managing the digital video recorder timer of claim 1, further comprising a second television receiver, wherein the television receiver is a first television receiver and the second television receiver is associated with the user account, the timer management computer system being further configured to:
   based on the received timer, notify the second television receiver of the timer, which comprises the timer management computer system being configured to:
      create a second addressed message addressed to the second television receiver for transmission via the satellite-based television provider distribution network, wherein the addressed message indicates the timer; and
      cause the second addressed message to be transmitted to the second television receiver via the satellite-based television provider distribution network; wherein in response to being notified of the timer, the second television receiver records the television channel at the date and the time indicated by the timer.

8. A method for managing a digital video recorder timer, the method comprising:
   receiving, by a timer management computer system, a timer associated with a user account, wherein the timer specifies a television channel, a date, and a time period for recording;
   determining, by the timer management computer system, a television receiver associated with the user account; and
   in response to the received timer, notifying the television receiver of the timer, which comprises the timer management computer system:
      creating an addressed message addressed to the television receiver for transmission via a satellite-based television provider distribution network, wherein the addressed message indicates the timer; and
      causing the addressed message to be transmitted to the television receiver via the satellite-based television provider distribution network.

9. The method for managing the digital video recorder timer of claim 8, the method further comprising:
   in response to being notified of the timer, recording, by the television receiver, the television channel on the date at the time period indicated by the timer.

10. The method for managing the digital video recorder timer of claim 8, the method comprising:
    transmitting, by a second television receiver, the timer associated with the user account to the timer management computer system via the Internet, wherein the television receiver is a first television receiver.

11. The method for managing the digital video recorder timer of claim 8, the method further comprising:
    transmitting the timer associated with the user account to the timer management computer system via the Internet the timer is received by the timer management computer system, the device performing the transmitting selected from the group consisting of:
- a mobile phone;
- a tablet computer;
- a laptop computer; and
- a desktop computer system.

12. The method for managing the digital video recorder timer of claim 8, wherein the addressed message is an entitlement management message (EMM).

13. The method for managing the digital video recorder timer of claim 8, further comprising:
   recording, by the television receiver, television programming received via the satellite-based television provider distribution network in accordance with the timer indicated by the addressed message.

14. The method for managing the digital video recorder timer of claim 8, the method further comprising:
   determining, by the timer management computer system, a second television receiver associated with the user account, wherein the television receiver is a first television receiver; and
   based on the received timer, notifying, by the timer management computer system, the second television receiver of the timer, which comprises the timer management computer system:
      creating a second addressed message addressed to the second television receiver for transmission via the satellite-based television provider distribution network, wherein the addressed message indicates the timer; and
      causing the second addressed message to be transmitted to the second television receiver via the satellite-based television provider distribution network; wherein, in response to being notified of the timer, the second television receiver records the television channel at the date and the time indicated by the timer.

15. A method for managing a digital video recorder timer, the method comprising:
   receiving, by a timer management computer system, a timer associated with a user account, wherein the timer specifies a television channel, a date, and a time period for recording;
   determining, by the timer management computer system, a television receiver associated with the user account;
   determining, by the timer management computer system, a timer conflict is present between the timer and a previously-scheduled timer at the television receiver;
   resolving, by the timer management computer system, the timer conflict; and
   in response to the received timer and resolving the timer conflict, notifying the television receiver of the timer, which comprises the timer management computer system:
      creating a message addressed to the television receiver, wherein the message indicates the timer; and
      causing the message to be transmitted to the television receiver.

16. The method for managing the digital video recorder timer of claim 15, wherein determining the timer conflict is present comprises:
   determining that the date and time period of recording overlaps with the previously-scheduled timer stored in a database accessible by the timer management computer system and that the television receiver has insufficient resources to record both the timer and the previously-scheduled timer.

17. The method for managing the digital video recorder timer of claim 15, wherein resolving the timer conflict comprises:
   comparing, by the timer management computer system, a first priority level of the timer and a second priority level of the previously-scheduled timer.

18. The method for managing the digital video recorder timer of claim 15, wherein resolving the timer conflict comprises:
   transmitting, by the timer management computer system, a query to a user device that requests selection of the timer or the previously-scheduled timer; and
   receiving, by the timer management computer system, a user selection in response to the query that selects the timer.

19. The method for managing the digital video recorder timer of claim 15, wherein notifying the television receiver of the timer further comprises:
   determine if an Internet connection is available with the television receiver;
   if the Internet is available, use the Internet to notify the television receiver of the timer; and
   if the Internet is not available, transmit the message addressed for the television receiver via a satellite-based television provider distribution network.

20. The method for managing the digital video recorder timer of claim 19, wherein the message is an entitlement management message (EMM).

21. A non-transitory processor-readable medium for managing a digital video recorder timer, comprising processor-readable instructions configured to cause one or more processors to:
   receive a time associated with the user account, wherein the timer specifies a television channel, a date, and a time period for recording; and
   based on the received timer notify the television receiver of the timer which comprises the timer management computer system being configured to:
      create an addressed message addressed to the television receiver for transmission via the satellite-based television provider distribution network, wherein the addressed message indicated the timer; and
      cause the addressed message to be transmitted to the television receiver via the satellite-based television provider distribution network; wherein, in response to being notified of the timer, the television receiver records the television channel at the date and the time period indicated by the timer.

22. A system for managing a digital video recorder timer, the system comprising:
   one or more processors; and
   a memory communicatively coupled with and readable by the one or more processors and having stored therein processor-readable instructions which, when executed by the one or more processors, cause the one or more processors to:
      receive a timer associated with the user account, wherein the timer specifies a television channel, a date, and a time period for recording; and
      based on the received timer, notify the television receiver of the timer, which comprises the timer management computer system being configured to:
         create an addressed message addressed to the television receiver for transmission via the satellite-based television provider distribution network, wherein the addressed message indicated the timer; and cause the addressed message to be transmitted to the television receiver via the satellite-based television provider distribution network; wherein, in response to being notified of the timer, the television receiver records the television channel at the date and the time period indicated by the timer.

23. A non-transitory processor-readable medium for managing a digital video recorder timer, comprising processor-readable instructions, which when executed, cause one or more processors to:
  receive a timer associated with a user account, wherein the timer specifies a television channel, a date, and a timer period for recording;
  determine a television receiver associated with the user account;
  determine a timer conflict is present between the timer and a previously-scheduled timer at the television receiver;
  resolve the timer conflict; and
  in response to the received timer and resolving the timer conflict, notify the television receiver of the timer, which comprises:
    creating a message addressed to the television receiver, wherein the message indicates the timer; and
    causing the message to be transmitted to the television receiver.

24. The non-transitory processor-readable medium of claim 23, wherein the processor-readable instructions, when executed, further cause the one or more processors to:
  determine if an Internet connection is available with the television receiver;
  if the Internet is available, use the Internet to notify the television receiver of the timer; and
  if the Internet is not available, transmit the message addressed for the television receiver via a satellite-based television provider distribution network.

25. The non-transitory processor-readable medium of claim 23, wherein the processor-readable instructions that, when executed, cause the one or more processors to cause the message to be transmitted to the television receiver comprise processor-readable instructions which, when executed, cause the one or more processors to:
  cause the message addressed for the television receiver to be transmitted via a satellite-based television provider distribution network to the television receiver.

26. A system for managing a digital video recorder timer, the system comprising:
  one or more processors; and
  a memory communicatively coupled with and readable by the one or more processors and having stored therein processor-readable instructions which, when executed by the one or more processors, cause the one or more processors to:
    receive a timer associated with a user account, wherein the timer specifies a television channel, a date, and a timer period for recording;
    determine a television receiver associated with the user account;
    determine a timer conflict is present between the timer and a previously-scheduled timer at the television receiver;
    resolve the timer conflict; and
    in response to the received timer and resolving the timer conflict, notify the television receiver of the timer, which comprises:
      creating a message addressed to the television receiver, wherein the message indicates the timer; and
      causing the message to be transmitted to the television receiver.

27. The system of claim 26, wherein the processor-readable instructions, when executed, further cause the one or more processors to:
  determine if an Internet connection is available with the television receiver;
  if the Internet is available, use the Internet to notify the television receiver of the timer; and
  if the Internet is not available, transmit the message addressed for the television receiver via a satellite-based television provider distribution network.

28. The system of claim 26, wherein the processor-readable instructions that, when executed, cause the one or more processors to cause the message to be transmitted to the television receiver comprise processor-readable instructions which, when executed, cause the one or more processors to:
  cause the message addressed for the television receiver to be transmitted via a satellite-based television provider distribution network to the television receiver.

* * * * *